(12) United States Patent
Trainham et al.

(10) Patent No.: US 11,993,177 B1
(45) Date of Patent: May 28, 2024

(54) PREDICTIVE TEMPERATURE REGULATION

(71) Applicant: Rivian IP Holdings, LLC, Irvine, CA (US)

(72) Inventors: Matthew Trainham, Rancho Santa Margarita, CA (US); Carl Stoye, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/458,072

(22) Filed: Aug. 29, 2023

(51) Int. Cl.
*B60L 58/26* (2019.01)

(52) U.S. Cl.
CPC .................... *B60L 58/26* (2019.02)

(58) Field of Classification Search
CPC .......... B60L 58/10; B60L 58/24; B60L 58/26; B60L 58/32; B60L 58/33

USPC ......................................................... 320/150
See application file for complete search history.

(56) References Cited

U.S. PATENT DOCUMENTS

2020/0376927 A1* 12/2020 Rajaie ................ B60H 1/00764
2023/0001824 A1* 1/2023 Shaotran ............. H01M 10/486

* cited by examiner

*Primary Examiner* — Paul Dinh
(74) *Attorney, Agent, or Firm* — BAKERHOSTETLER

(57) ABSTRACT

Aspects of the subject disclosure relate to predictive vehicle battery temperature regulation. A device implementing the subject technology may include a processor configured to obtain different types of data associated with a route projection of a vehicle. The processor can determine a thermal demand projection of the vehicle that maps to the route projection based on the different types of data. The processor also can adjust a temperature of a battery of the vehicle to within a predefined temperature range based on the thermal demand projection for the route projection.

20 Claims, 6 Drawing Sheets

PREDICTIVE TEMPERATURE REGULATION

INTRODUCTION

Batteries are often used as a source of power, including as a source of power for electric vehicles that include wheels that are driven by an electric motor that receives power from the battery.

Efficient thermal management of electric vehicle (EV) battery cells during a trip can play a crucial role in optimizing battery charge and battery life. By effectively regulating the temperature of battery cells, thermal management systems optimize the performance and lifespan of EV batteries. These systems employ various techniques such as active cooling or heating, liquid or air cooling, and intelligent temperature control algorithms. By maintaining an ideal temperature range, thermal management minimizes the risk of overheating or excessive cooling, preventing thermal degradation and preserving battery efficiency. This not only enhances the range of EVs but also enables faster charging and reduces the need for excessive battery capacity, thereby lowering the overall environmental footprint of electric transportation. Additionally, efficient thermal management helps maximize the use of renewable energy sources by enabling smart charging and discharging strategies.

SUMMARY

This disclosure is generally directed to predictive temperature regulation by enhancing battery cell temperatures that fluctuate under different driving conditions, which can cause performance variations in acceleration and deceleration of the vehicle, thus degrading the driving experience of the vehicle. For example, during scenarios of propulsion events, the vehicle may not have a desired amount of power to achieve certain longitudinal maneuvers or maintain a desired velocity. Similarly, during scenarios of regenerative braking events, the vehicle may not decelerate by a desired amount.

The subject technology provides for regulating the battery cell temperatures to their optimal operating conditions by predicting future thermal demand along a route projection. For example, a further thermal demand may be a charging event, where the subject technology can predict such charging event along a route to pre-cool for the charging event. Such thermal demand projections can be based on several pieces of information, including map data indicating road speed, terrain elevation and grade data; ambient environment temperature data; vehicle system mass data providing the weight load of the vehicle (including any towed objects such as a trailer); traffic data; historical driver data; near-by infrastructure data; and other input signaling available to advise the thermal demand projections.

The subject technology can preemptively adjust the battery cell temperatures to a desired temperature setpoint or to within a predefined temperature range such that the battery cell temperatures do not exceed a temperature threshold within the predefined temperature range when the vehicle is operating under the thermal demand projections. For example, when the ambient environment temperature is, or will be, at a low temperature (e.g., freezing climate) and the thermal demand projection is not likely to keep the battery cell temperatures within the predefined temperature range along the route projection, the subject technology can increase the battery cell temperatures to the desired temperature setpoints so that the battery cells can perform closer to their optimal operating conditions at certain points along the route projection.

Conversely, when the ambient environment temperature is, or will be, at a high temperature (e.g., hot climate), or when the road of the route projection has road characteristics such as uphill or downhill grade or varying speed, and the thermal demand projection is likely to push the battery cell temperatures beyond the predefined temperature range, the subject technology can reduce the battery cell temperatures down to the desired temperature setpoints so that when the vehicle reaches the high thermal loading event during the route, the battery cell temperatures do not exceed the cell temperature thresholds within the predefined temperature range, which will degrade performance and driving experience/predictability. The subject technology can continuously monitor the battery cell temperatures throughout the route projection and make any necessary battery temperature changes incrementally to satisfy the thermal demand projections without causing undesired performance in the vehicle.

In accordance with one or more aspects of the disclosure, a vehicle management system is provided that includes a controller configured to obtain different types of data associated with a route projection of a vehicle; determine a thermal demand projection of the vehicle that maps to at least a portion of the route projection based on the different types of data; and adjust a temperature of a battery of the vehicle to within a predefined temperature range based on the thermal demand projection for the at least a portion of the route projection.

In accordance with one or more aspects of the disclosure, a method includes determining a route projection of a vehicle based at least in part on user input; obtaining thermal loading data comprising different types of data associated with the route projection; determining a thermal demand projection of the vehicle that maps to at least a portion of the route projection based on the thermal loading data; and adjusting a temperature of a battery of the vehicle to within a predefined temperature range based on the thermal demand projection for the at least a portion of the route projection.

In accordance with one or more aspects of the disclosure, a vehicle including a battery; a temperature control unit; and a controller configured to determine a route projection of a vehicle; determine a thermal demand projection of the vehicle that maps to at least a portion of the route projection using different types of data associated with the route projection; and adjust, using the temperature control unit, a temperature of the battery to a temperature setpoint within a predefined temperature range based on the thermal demand projection for the at least a portion of the route projection.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
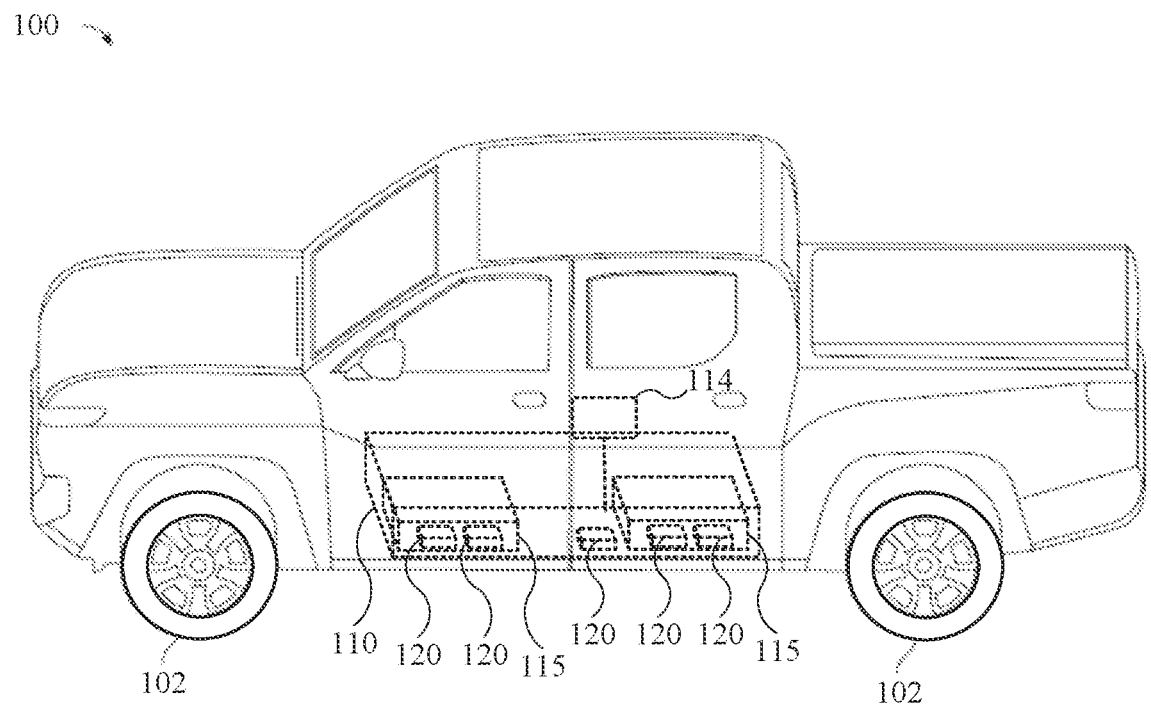
FIG. 1 illustrates a schematic perspective side view of an example implementation of a vehicle having a battery pack, in accordance with aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form to avoid obscuring the concepts of the subject technology.

Battery management systems play a crucial role in thermal management by monitoring and controlling the temperature of individual battery cells. A battery management system can adjust the cooling system or charging rate to maintain optimal battery temperature, prevent thermal runaway, and extend the life of the battery pack. However, there are several problems that can arise with battery management systems in electric vehicles. For example, inadequate thermal management of battery cell temperatures in an electric vehicle can result in several forms of reduced performance, including reduced driving range, reduced acceleration, reduced deceleration, reduced battery life, reduced charging speed and reduced overall performance.

Both increased and decreased battery cell temperatures beyond a certain temperature can cause changes in both propulsion performance and regenerative braking performance in electric vehicles. During scenarios of a change in propulsion performance, a driver may have a certain level of power available (or acceleration/deceleration capability) to achieve certain longitudinal maneuvers or maintain the desired vehicle speed. A change in propulsion performance can occur because high battery temperatures can lead to increased internal resistance and reduced battery current capacity, which can result in a reduction in the available power and energy. For example, when driving either up or down steep grades and/or during extreme heat environment conditions, cell temperatures will increase due to higher current flow demand. This can cause a decrease in either the acceleration or the regenerative braking deceleration ability of the vehicle, as well as a reduction in the driving range.

During scenarios of regenerative braking degeneration, a driver may not have the same ability to decelerate as expected. Regenerative braking performance degradation occurs because the regenerative braking system relies on the battery to store energy generated during braking. If the battery temperature is too high, the regenerative braking system may not be able to capture as much energy as it would at a lower temperature, resulting in reduced braking efficiency and longer braking distances. Additionally, high battery temperatures can also lead to reduced battery lifespan and increased risk of thermal runaway. In another example, when driving in or towards cold weather on flat ground, battery temperatures may be too low. When the battery cell temperature is either above or below certain temperatures, the charge and discharge current is limited, resulting in propulsion and regenerative performance decreases. When the propulsion and regenerative performance is decreased, the ability for a driver to accelerate and decelerate with the electric powertrain (e.g., accelerator pedal) is decreased. Inconsistency of propulsion acceleration and deceleration performance can lead to drivability dissatisfaction.

The subject technology provides for predicting thermal demands from user-input navigation route and environmental conditions to pre-emptively cool or heat a battery pack to better maintain cell temperatures in the battery pack and reduce performance degradation. For example, during route projection, future thermal demands can be estimated by road speed and grade data (given by maps data), in addition to ambient environmental temperature from active vehicle sensors, or future environmental temperatures along the route from available weather data. Some prior approaches in thermal management are inefficient because they are reactive to thermal demand, whereas a predictive approach as described herein with respect to the subject technology can pre-condition the battery pack to address foreseeable events and more efficiently utilize thermal needs.

Aspects of the subject technology provide several advantages over prior approaches in battery temperature regulation. For example, the subject technology helps achieve increased thermal efficiency by decreased thermal components sizing and reduced costs. The subject technology achieves decreased battery cell degradation by providing longer battery life and having a reduced battery requirement, resulting in cost savings. The subject technology achieves increased driving performance and consistency, thereby improving drivability experience.

FIG. 1 is a diagram illustrating an example implementation of a moveable apparatus as described herein. In the example of FIG. 1, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid). In various implementations, the vehicle 100 may be a fully autonomous vehicle that can navigate roadways without a human operator or driver, a partially autonomous vehicle that can navigate some roadways without a human operator or driver or that can navigate roadways with the supervision of a human operator, may be an unmanned vehicle that can navigate roadways or other pathways without any human occupants, or may be a human operated (non-autonomous) vehicle configured for a human operator.

In the example of FIG. 1, the vehicle 100 is implemented as a truck (e.g., a pickup truck) having a battery pack 110.

As shown, the battery pack 110 may include one or more battery modules 115, which may include one or more battery cells 120. As shown in FIG. 1, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included in a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

In some implementations, the battery pack 110 can be combined with a thermal management device 114 that can regulate the cell temperatures of the battery pack 110 to their optimal operating conditions by predicting future thermal demand along a route projection of the vehicle 100. Such thermal demand projections can be based on several pieces of information, including map data indicating road speed, terrain elevation and grade data; ambient environment temperature data; vehicle system mass data providing the weight load of the vehicle 100 (including any towed objects such as a trailer); traffic data; historical driver data; near-by infrastructure data; and other input signaling available to advise the thermal demand projections. The thermal management device 114 can adjust the cell temperatures of the battery pack 110 to a desired temperature setpoint or to within a predefined temperature range in response to the predicted future thermal demand such that the cell temperatures of the battery pack 110 do not exceed a temperature threshold within the predefined temperature range when the vehicle 100 is operating under the thermal demand projections. For example, when the ambient environment temperature is at a low temperature (e.g., freezing climate) and the thermal demand projection is not likely to keep the cell temperatures of the battery pack 110 within the predefined temperature range along the route projection, the thermal management device 114 can increase the cell temperatures of the battery pack 110 to the desired temperature setpoints so that the battery pack 110 cells can perform closer to their optimal operating conditions at certain points along the route projection. Conversely, when the ambient environment temperature is at a high temperature (e.g., hot climate) and the thermal demand projection is likely to push the battery pack 110 cell temperatures beyond the predefined temperature range, the thermal management device 114 can reduce the battery cell temperatures down to the desired temperature setpoints. The thermal management device 114 can continuously monitor the battery pack 110 cell temperatures throughout the route projection and make any necessary battery temperature changes incrementally to satisfy the thermal demand projections without causing performance degradation in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 2:
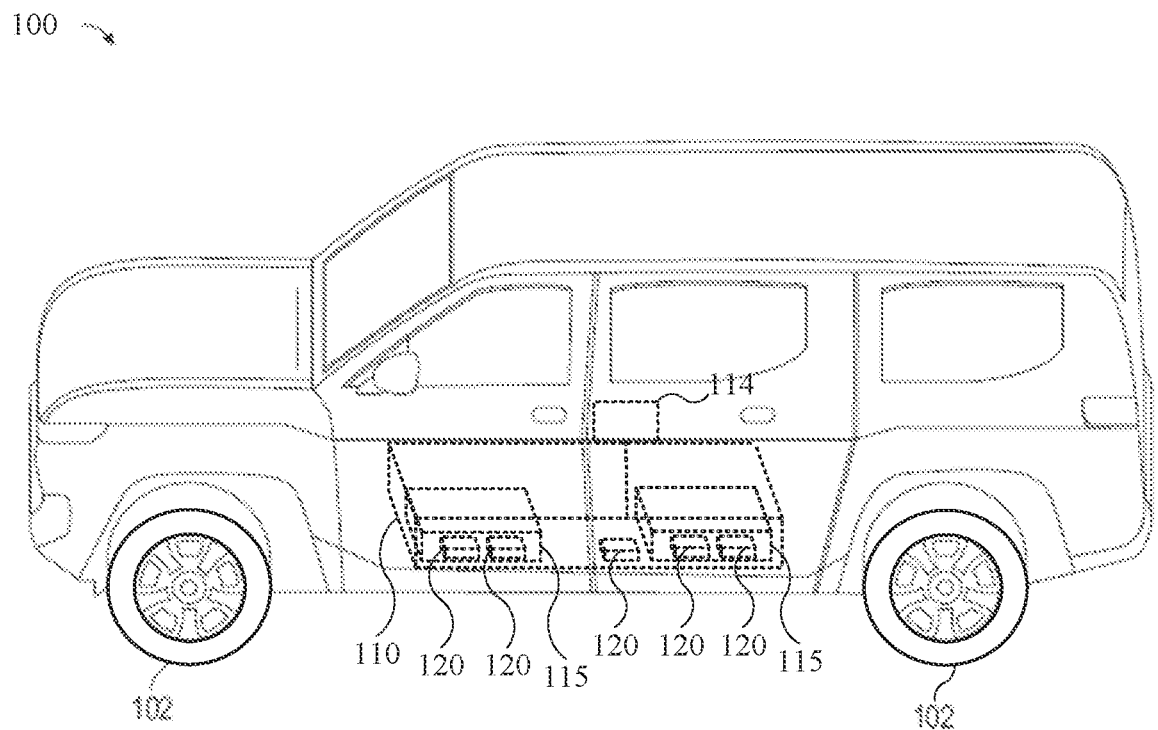
FIG. 2 illustrates a schematic perspective side view of another example implementation of a vehicle having a battery pack, in accordance with aspects of the present disclosure.

The example of FIG. 1 in which the vehicle 100 is implemented as a pickup truck having a truck bed at the rear portion thereof is merely illustrative. For example, FIG. 2 illustrates another implementation in which the vehicle 100 including the battery pack 110 is implemented as a sport utility vehicle (SUV), such as an electric sport utility vehicle. In the example of FIG. 2, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 3:
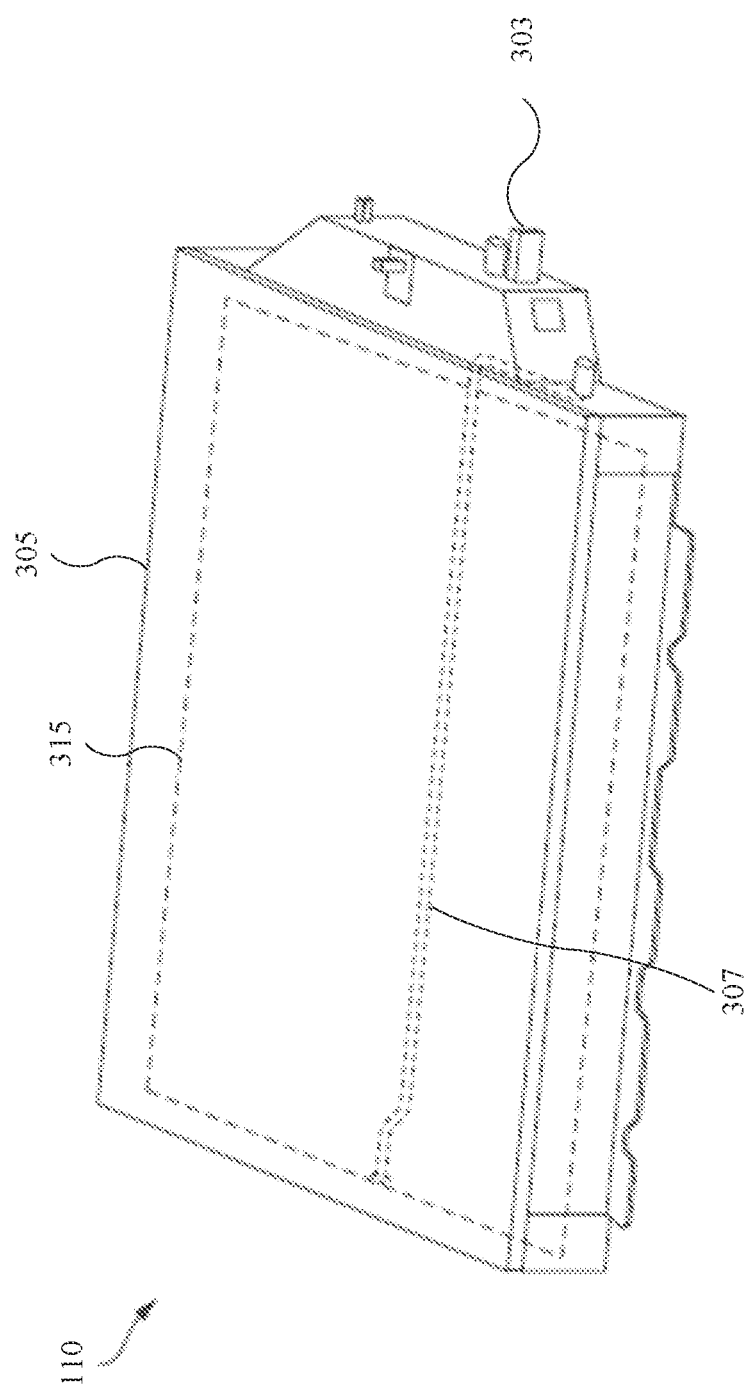
FIG. 3 illustrates a schematic perspective view of a battery pack in accordance with one or more implementations.

FIG. 3 depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 305 to generate a desired output voltage for the battery pack 110. The battery pack 110 may also include one or more external connection ports, such as an electrical contact 303 (e.g., a high voltage terminal). For example, an electrical cable (e.g., cable/connector 106) may be connected between the electrical contact 303 and an electrical system of the vehicle 100 or the building 180, to provide electrical power to the vehicle 100 or the building 180. In some aspects, the battery pack 110 may be connected to the thermal management device 114 via the electrical contact 303.

As shown, the battery pack 110 may include a battery pack frame 305 (e.g., a battery pack housing or pack frame). For example, the battery pack frame 305 may house or enclose one or more battery modules 115 and/or one or more battery cells 120, and/or other battery pack components. In one or more implementations, the battery pack frame 305 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 307 (e.g., cooling lines and/or plates and/or heating lines and/or plates). For example, thermal control structures 307 may couple thermal control structures and/or fluids to the battery modules 115, battery units, batteries, and/or battery cells 120 within the battery pack frame 305, such as by distributing fluid through the battery pack 110.

For example, the thermal control structures 307 may form a part of a thermal/temperature control or heat exchange system that includes one or more thermal components 315 such as plates or bladders that are disposed in thermal contact with one or more battery modules 115 and/or battery cells 120 disposed within the battery pack frame 305. For example, a thermal component 315 may be positioned in contact with one or more battery modules 115, battery units, batteries, and/or battery cells 120 within the battery pack frame 305. In one or more implementations, the battery pack 110 may include one or multiple thermal control structures 307 and/or other thermal components for each of several top and bottom battery module pairs. As shown, the battery pack 110 may include an electrical contact 303 (e.g., a high voltage connector) by which an external load (e.g., the vehicle 100) may be electrically coupled to the battery modules and/or battery cells in the battery pack 110.

Figure 4:
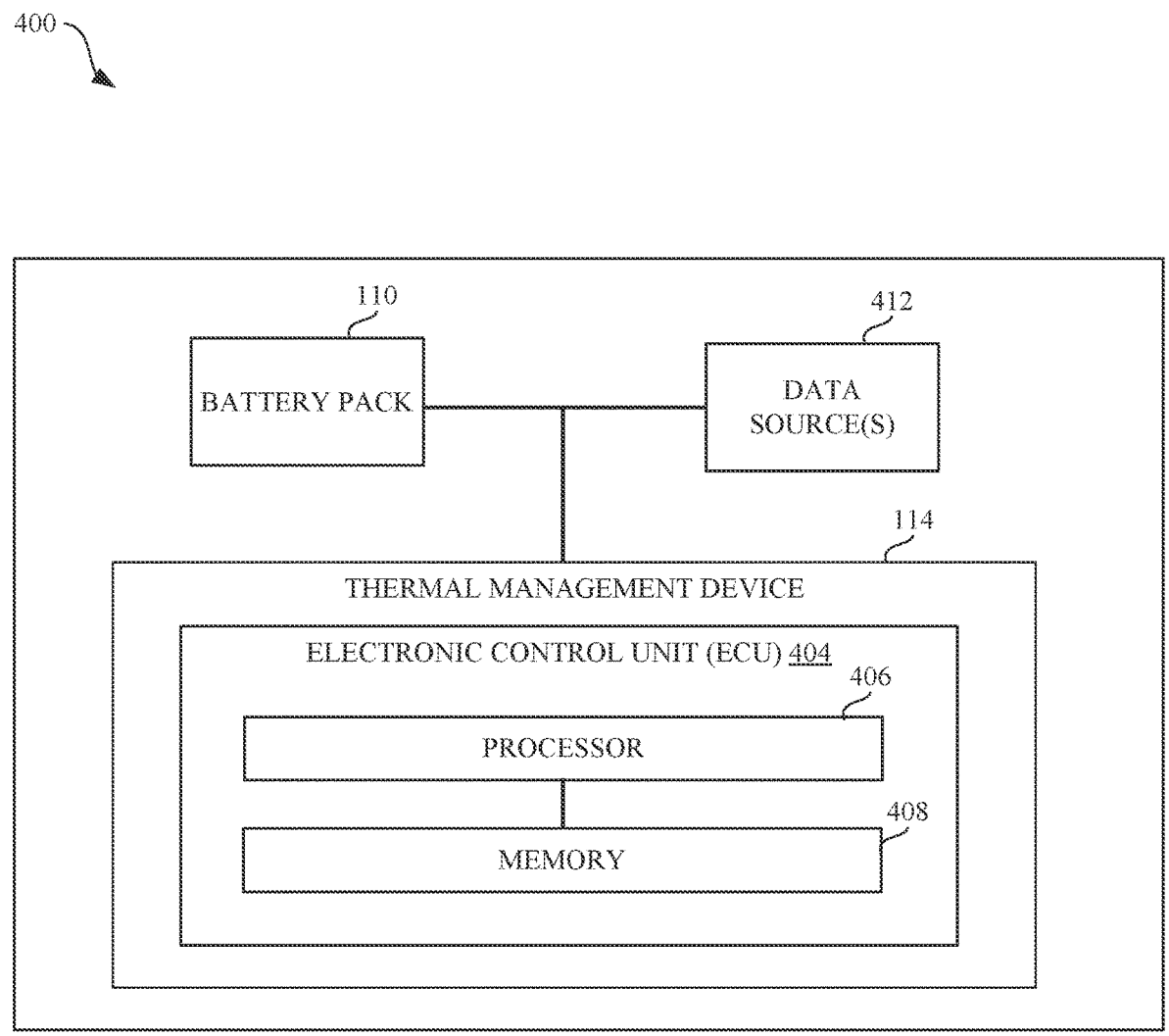
FIG. 4 illustrates a block diagram of an example vehicle configured to perform predictive temperature regulation in accordance with one or more implementations of the subject technology.

FIG. 4 illustrates a block diagram of an example vehicle 400 configured to perform predictive temperature regulation in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The vehicle 400 may include the battery pack 110, the thermal management device 114 and data sources 412. The thermal management device 114 may include one or more electronic control units (ECUs) 404. The ECU 404 may include a processor 406 and a memory 408. In one or more implementations, the vehicle 400 may include a processor 406 and/or a memory 408 separate from the ECU 404. For example, the vehicle 400 may not include the ECU 404 and may include the processor 406 as a part or all of a separate semiconductor device. In one or more implementations, vehicle 400 may include multiple ECUs 404 that each control particular functionality of the vehicle 400.

The processor 406 may include suitable logic, circuitry, and/or code that enables processing data and/or controlling operations of the vehicle 400. In this regard, the processor 406 may be enabled to provide control signals to various other components of the vehicle 400, such as for example, the thermal management device 114. For example, the thermal management device 114 may receive a signal from the ECU 404 (e.g., from the processor 406 of the ECU 404), such as a signal to regulate the cell temperatures of the battery pack 110. The processor 406 may also control transfers of data between various portions of the vehicle 400. The processor 406 may further implement an operating system, such as a real-time operating system, or may otherwise execute code to manage operations of the vehicle 400.

The memory 408 may include suitable logic, circuitry, and/or code that enable storage of various types of information such as received data, machine learning model data (such as for computer vision and/or other user/object detection algorithms), user authentication data, and/or configuration information. The memory 408 may include, for example, random access memory (RAM), read-only memory (ROM), flash, and/or magnetic storage. In one or more implementations, the memory 408 may store identifiers and/or authentication information of one or more users to determine authorized users and/or authorized authentication devices of the vehicle 400. The memory 408 may also store account information corresponding to an authorized user for exchanging information between the vehicle 400 and a remote server. The memory 408 may also store location data, including the geographic locations of historical route projections. The memory 408 may also store thermal loading data relating to historical route projections. The memory 408 may also store battery data, including an amount of time that has elapsed since the battery was last thermally regulated.

In one or more implementations, one or more of the processor 406, the memory 408, the battery pack 110, the thermal management device 114, the data sources 412, the ECU 404, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both.

In some implementations, the thermal management device 114 can regulate cell temperatures of the battery pack 110 to their optimal operating conditions by predicting future thermal demand along a route projection of the vehicle 400. In some aspects, the thermal management device 114 may regulate the battery pack 110 cell temperatures using at least in part the ECU 404 and/or the processor 406.

The thermal management device 114 can adjust the cell temperatures of the battery pack 110 to a desired temperature setpoint or to within a predefined temperature range such that the cell temperatures of the battery pack 110 do not exceed a temperature threshold within the predefined temperature range when the vehicle 400 is operating under the thermal demand projections. For example, when the ambient environment temperature is at a low temperature (e.g., freezing climate) and the thermal demand projection is not likely to keep the cell temperatures of the battery pack 110 within the predefined temperature range along the route projection, the thermal management device 114 can increase the cell temperatures of the battery pack 110 to the desired temperature setpoints so that the battery pack 110 cells can perform closer to their optimal operating conditions at certain points along the route projection. Conversely, when the ambient environment temperature is at a high temperature (e.g., hot climate) and the thermal demand projection is likely to push the battery pack 110 cell temperatures beyond the predefined temperature range, the thermal management device 114 can reduce the battery cell temperatures down to the desired temperature setpoints. The thermal management device 114 can continuously monitor the battery pack 110 cell temperatures throughout the route projection and make any necessary battery temperature changes incrementally to satisfy the thermal demand projections without causing performance degradation in the vehicle 400.

In some implementations, such thermal demand projections can be based on several pieces of thermal loading information from one or more data sources 412, including map data indicating road speed, terrain elevation and grade data; ambient environment temperature data; vehicle system mass data providing the weight load of the vehicle 400 (including any towed objects such as a trailer); traffic data; historical driver data; near-by infrastructure data; and other input signaling available to advise the thermal demand projections.

Figure 5:
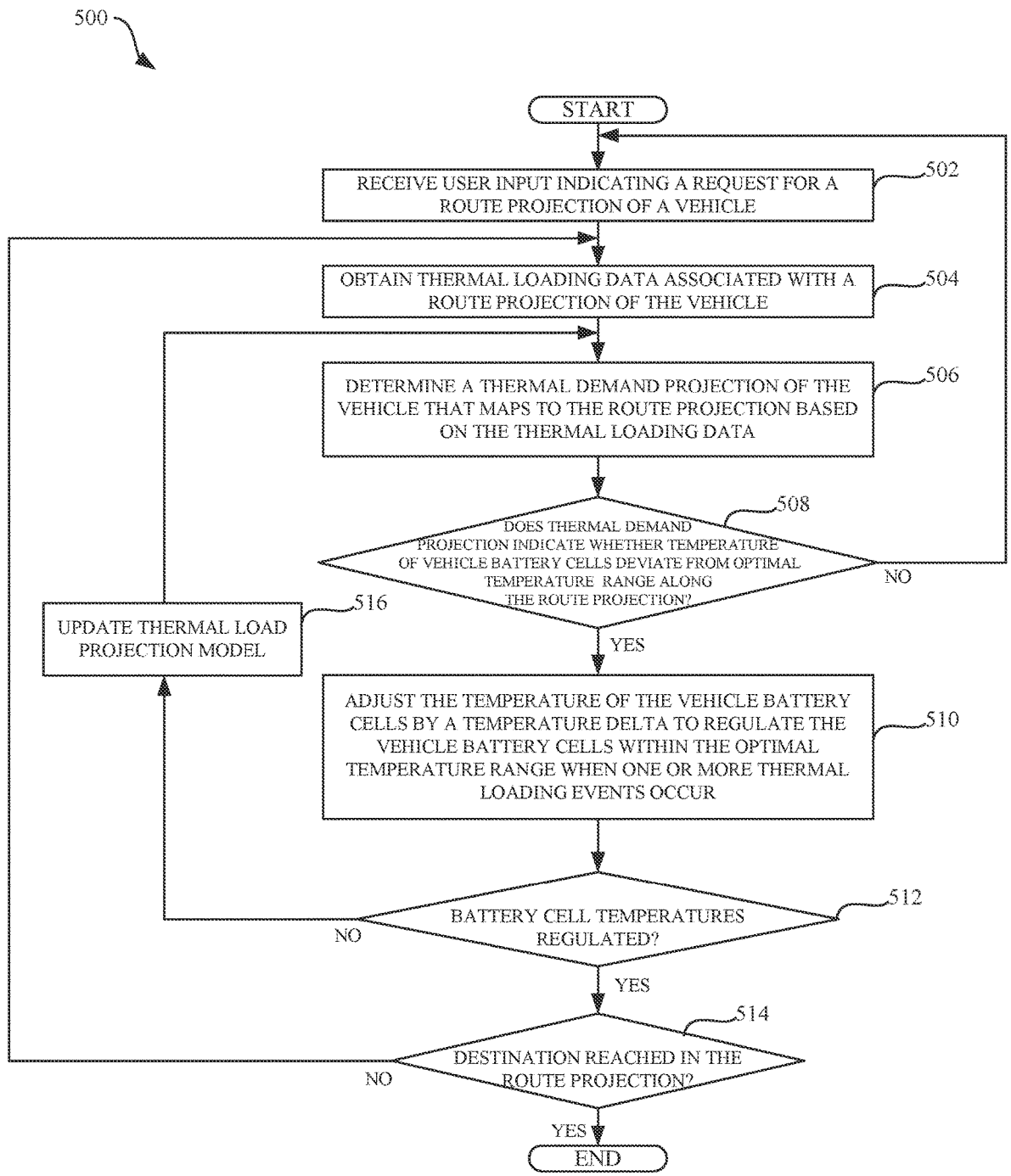
FIG. 5 illustrates a flow diagram of an example process for performing predictive temperature regulation in accordance with one or more implementations of the subject technology.

FIG. 5 illustrates a flow diagram of an example process 500 for performing predictive temperature regulation in accordance with one or more implementations of the subject technology. For explanatory purposes, the process 500 is primarily described herein with reference to the vehicle 100 of FIGS. 1 and 2, and/or various components thereof. However, the process 500 is not limited to the vehicle 100 of FIG. 1, and one or more steps (or operations) of the process 500 may be performed by one or more other structural components of the vehicle 100 and/or of other suitable moveable apparatuses, devices, or systems. Further, for explanatory purposes, some of the steps of the process 500 are described herein as occurring in serial, or linearly. However, multiple steps of the process 500 may occur in parallel. In addition, the steps of the process 500 need not be performed in the order shown and/or one or more steps of the process 500 need not be performed and/or can be replaced by other operations.

At step 502, the vehicle 100 may receive user input indicating a request for a route projection of the vehicle 100. At step 504, the vehicle 100 may obtain, by a processor (e.g., the processor 406), obtain thermal loading data associated with a route projection of the vehicle 100. In some implementations, the thermal loading data may include different types of data, including but not limited to, map data, environmental temperature data, or system mass data associated with the vehicle 100. The map data may include information about route elevation and speed data to provide energy demands of the vehicle 100. The environmental temperature data may include route temperature data that can be sourced from location/weather live data, temperature predictions based on current ambient temperatures using a trained machine learning model or based on current ambient temperatures. The system mass data may include estimation information of a vehicle system mass that has input to the thermal demands of the vehicle 100. In some aspects, the system mass data may coexist in onboard software of the vehicle 100.

Using multiple inputs available onboard the vehicle 100, including but not limited to, measured ambient conditions, cloud weather, traffic, and terrain data, planned route from in-vehicle navigation, historic driver habit data, stored (potentially user-input or services/modeled) data for vehicle/trailer/payload values, and other onboard or near-by infrastructure data sources, the processor can cause preconditioning of the vehicle 100 thermal systems predictively for upcoming terrain. This predictive temperature regulation can include optimization of charging and potential thermal energy storage, with or without user interactions, scheduling timers, acknowledgements, etc.

In some implementations, the vehicle 100 may obtain, by a processor (e.g., the processor 406), user input that indicates a navigation destination for route planning and is processed by the processor for generating the route projection of the vehicle 100.

At step 506, the vehicle 100 may determine, by a processor (e.g., the processor 406), a thermal demand projection of the vehicle 100 that maps to one or more portions of the route projection based on the different types of data. For example, the processor can estimate the thermal demands of the vehicle 100 for certain types of terrain present along the route projection. The processor can calculate the thermal demand of a certain terrain based on that terrain's road grade and elevation using historical energy demand and thermal response that corresponds to that type of terrain. In some aspects, steep incline road grades along the route projection may require propulsion generation for continuous or intermittent periods of time, thus increasing the thermal demand for discharging energy along that portion of the route projection. Conversely, steep decline road grades along the route projection may require regenerative braking for continuous or intermittent periods of time, thus increasing the thermal demand for storing energy along that portion of the route projection. In some aspects, the processor, using a trained machine learning model, can predict the thermal demands of the vehicle 100 along the route projection.

At step 508, the vehicle 100 may determine, by a processor (e.g., the processor 406), whether the thermal demand projection will deviate from an optimal temperature range along the route projection by determining that the temperature of a vehicle battery is predicted to exceed a temperature threshold within a predefined temperature range at the one or more portions of the route projection. If the thermal demand projection causes the temperature of a vehicle battery to exceed the threshold, the process 500 proceeds to step 508. Otherwise, the process 500 proceeds back to step 504. When the battery cell temperature is either above or below certain temperature thresholds, the charge and discharge current is limited, resulting in propulsion and regenerative performance decreases. When the propulsion and regenerative performance is decreased, the ability for a driver of the vehicle 100 to accelerate and decelerate with an electric powertrain is decreased.

As such, the subject technology predicts the thermal demands from the user-provided navigation route and environmental conditions to pre-emptively cool or heat the battery pack 110 to better maintain cell temperatures and reduce performance degradation. For example, the thermal management device 114, via the processor 406, may determine whether the thermal demand projection is predicted to cause at least in part the temperature of the battery to exceed a temperature threshold within the predefined temperature range at the at least a portion of the route projection.

The thermal management device 114 can proactively control the battery cell temperatures by adjusting the temperature of the battery by a temperature delta based on the thermal demand projection being predicted to cause at least in part the temperature of the battery to exceed the temperature threshold within the predefined temperature range at the at least a portion of the route projection. In this regard, when a thermal loading event occurs along the route, the preconditioning of the battery cell temperatures has provided sufficient temperature delta that enables the battery to stay within the predefined temperature range at optimal operating conditions, thus reducing any undesired performance effects on vehicle acceleration and deceleration along the route. For example, at step 510, the vehicle 100 may adjust the temperature of the vehicle battery by a temperature delta to regulate the vehicle battery cell temperatures within a predefined temperature range when one or more thermal loading events occur. In some aspects, the thermal loading event may represent the occurrence of the thermal demand projection causing at least in part the battery temperature to exceed the temperature threshold at the one or more portions of the route projection. In some aspects, the predefined temperature range may define a range of temperature setpoints that allow the battery (e.g., battery pack 110) to perform at or near optimal operating conditions and help maintain propulsion and regenerative performance of the vehicle 100.

In some aspects, the thermal management device 114 may monitor the temperature of the battery throughout different parts of the entire route and compare the temperature to the temperature threshold. In some aspects, the predefined temperature range may be preconfigured on the onboard software of the vehicle 100. In other aspects, the predefined temperature range may be user configurable such that a driver of the vehicle 100 may provide user input indicating temperature setpoint boundaries for the range. In some implementations, the predefined temperature range may include, or have at least one boundary defined by, the temperature threshold used to compare with the temperature of the vehicle battery.

In one or more implementations, the temperature of the battery is adjusted to within the predefined temperature range at least a threshold time prior to the vehicle reaching a type of terrain at a location of a route that corresponds to the at least a portion of the route projection. In some aspects, the thermal management device 114, via the processor 406, may adjust the battery cell temperatures by increasing or decreasing the cell temperatures to a temperature setpoint within the predefined temperature range prior to the vehicle 100 arriving to a geographic location that corresponds to the location on the route.

For example, in cold climate environments, the temperature of the battery can be adjusted by increasing the temperature of the battery to within the predefined temperature range based on an ambient environment temperature surrounding the vehicle (e.g., cold air temperature) and the thermal demand projection being predicted to cause the temperature of the battery to decrease beyond the temperature threshold. Here, the battery is heated to provide optimized battery cell performance along the route.

In another example, in hot climate environments, the temperature of the battery can be adjusted by reducing the temperature of the battery to within the predefined temperature range based on an ambient environment temperature surrounding the vehicle (e.g., hot air temperature) and the thermal demand projection being predicted to cause the temperature of the battery to increase beyond the temperature threshold. Here, the battery is cooled to provide optimized battery cell performance along the route.

In some implementations, the amount of temperature adjustment may be closely correlated to the amount of energy to be charged or discharged. In some aspects, the adjustments to the temperature may be performed incrementally until the desired temperature within the predefined temperature range is reached.

For example, the temperature of the battery can be adjusted to a temperature setpoint within the predefined temperature range by an incremental change in temperature that corresponds to at least an amount of energy to be discharged from the battery responsive to one or more propulsion events of the vehicle 100 when the vehicle 100 reaches a type of terrain at a location of a route that corresponds to the at least a portion of the route projection. Here, the thermal management device 114 may estimate that a certain amount of energy will need to be discharged when the vehicle travels through a steep incline terrain and the ambient temperature of the surrounding environment is significantly high, thus requiring the battery pack 110 to be cooled to an estimated temperature setpoint prior to reaching the corresponding location on the route projection that would allow any increases in temperature due to the projected thermal demand to remain within the predefined temperature range.

In another example, the temperature of the battery can be adjusted to a temperature setpoint within the predefined temperature range by an incremental change in temperature that corresponds to at least an amount of energy to be stored in the battery responsive to one or more regenerative braking events of the vehicle when the vehicle reaches a type of terrain at a location of a route that corresponds to the at least a portion of the route projection. Here, the thermal management device 114 may estimate that a certain amount of energy will need to be charged as part of the regenerative braking process when the vehicle travels through a steep decline terrain, for example, and the ambient temperature of the surrounding environment is significantly high, thus requiring the battery pack 110 to be cooled to an estimated temperature setpoint prior to reaching the corresponding location on the route projection that would allow any increases in temperature due to the projected thermal demand to remain within the predefined temperature range. Conversely, the battery pack 110 would need to be heated to an estimated temperature setpoint if the ambient temperature of the surrounding environment is significantly low to allow any increases in temperature due to the projected thermal demand to remain within the predefined temperature range and thereby maintain the battery pack 110 operating at optimal conditions.

At step 512, the vehicle 100 may determine, by a processor (e.g., the processor 406), whether the battery temperature is maintained. If the battery temperature is maintained, the process 500 proceeds to step 514. Otherwise, the process 500 proceeds to step 516. For example, the thermal management device 114 may measure the temperature of the battery at least a threshold time prior to the vehicle reaching a type of terrain at a location of a route that corresponds to the at least a portion of the route projection, and determine whether the temperature of the battery is maintained within the predefined temperature range corresponding to the at least a portion of the route projection. If the temperature is maintained within the predefined temperature range, the thermal management device 114 can take no action. However, the thermal management device 114 can adjust the temperature of the battery to within the predefined temperature range prior to the vehicle reaching the type of terrain at the location of the route when the temperature of the battery is not maintained within the predefined temperature range.

At step 514, the vehicle 100 may determine whether the vehicle 100 has reached its destination in the route projection. If the destination has been reached, then the process 500 ends. Otherwise, the process 500 proceeds back to step 504. In this regard, the thermal management device 114 can determine that the battery cell temperatures were managed and regulated throughout the route such that thermal strain, discharge and charge limits are not reached, resulting in maintenance of the regenerative and propulsion performance throughout the route.

At step 516, the vehicle 100 may update the thermal load projection model. Upon completing the model update, the process 500 may proceed to step 506.

Figure 6:
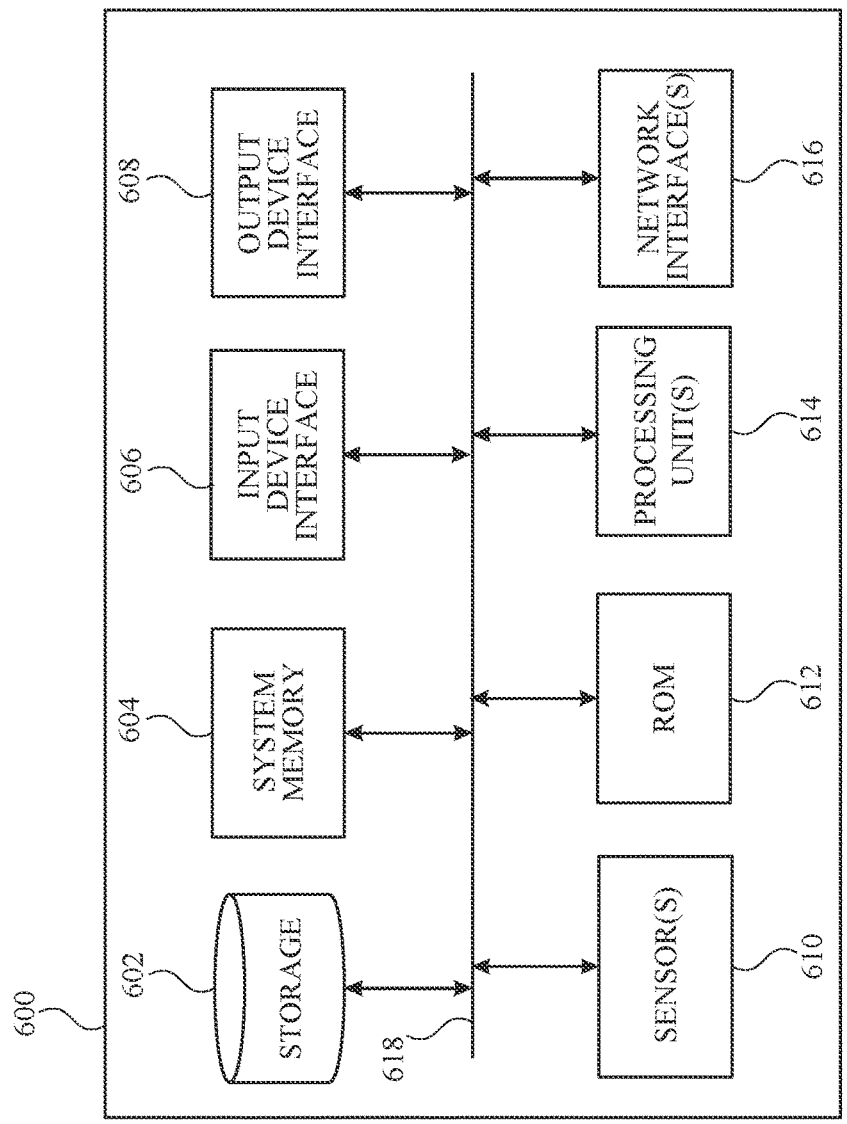
FIG. 6 illustrates an electronic system with which one or more implementations of the subject technology may be implemented.

FIG. 6 illustrates an example electronic system 600 with which aspects of the present disclosure may be implemented. The electronic system 600 can be, and/or can be a part of, any electronic device for providing the features and performing processes described in reference to FIGS. 1-5, including but not limited to a vehicle, computer, server, smartphone, and wearable device. The electronic system 600 may include various types of computer-readable media and interfaces for various other types of computer-readable media. The electronic system 600 includes a persistent storage device 602, system memory 604 (and/or buffer), input device interface 606, output device interface 608, sensor(s) 610, ROM 612, processing unit(s) 614, network interface 616, bus 618, and/or subsets and variations thereof.

The bus 618 collectively represents all system, peripheral, and chipset buses that communicatively connect the numerous internal devices and/or components of the electronic system 600, such as any of the components of the vehicle 100 discussed above with respect to FIG. 4. In one or more implementations, the bus 618 communicatively connects the one or more processing unit(s) 614 with the ROM 612, the system memory 604, and the persistent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations. In one or more implementations, one or more of the processing unit(s) 614 may be included on an ECU 204, such as in the form of the processor 206.

The ROM 612 stores static data and instructions that are needed by the one or more processing unit(s) 614 and other modules of the electronic system 600. The persistent storage device 602, on the other hand, may be a read-and-write memory device. The persistent storage device 602 may be a non-volatile memory unit that stores instructions and data even when the electronic system 600 is off. In one or more implementations, a mass-storage device (such as a magnetic or optical disk and its corresponding disk drive) may be used as the persistent storage device 602.

In one or more implementations, a removable storage device (such as a flash drive and its corresponding solid state device) may be used as the persistent storage device 602. Like the persistent storage device 602, the system memory 604 may be a read-and-write memory device. However, unlike the persistent storage device 602, the system memory 604 may be a volatile read-and-write memory, such as RAM. The system memory 604 may store any of the instructions and data that one or more processing unit(s) 614 may need at runtime. In one or more implementations, the processes of the subject disclosure are stored in the system memory 604, the persistent storage device 602, and/or the ROM 612. From these various memory units, the one or more processing unit(s) 614 retrieves instructions to execute and data to process in order to execute the processes of one or more implementations.

The persistent storage device 602 and/or the system memory 604 may include one or more machine learning models. Machine learning models, such as those described herein, are often used to form predictions, solve problems, recognize objects in image data, and the like. For example, machine learning models described herein may be used to predict the thermal demands of a vehicle battery pack along a certain part of a route of the vehicle. Various implementations of the machine learning model are possible. For example, the machine learning model may be a deep learning network, a transformer-based model (or other attention-based models), a multi-layer perceptron or other feedforward networks, neural networks, and the like. In various examples, machine learning models may be more adaptable as machine learning models may be improved over time by re-training the models as additional data becomes available.

The bus 618 also connects to the input device interfaces 606 and output device interfaces 608. The input device interface 606 enables a user to communicate information and select commands to the electronic system 600. Input devices that may be used with the input device interface 606 may include, for example, alphanumeric keyboards, touch screens, and pointing devices. The output device interface 608 may enable the electronic system 600 to communicate information to users. For example, the output device interface 608 may provide the display of images generated by electronic system 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 618 also connects to sensor(s) 610. The sensor(s) 610 may include a location sensor, which may be used in determining device position based on positioning technology. For example, the location sensor may provide for one or more of GNSS positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 610 may be utilized to detect movement, travel, and orientation of the electronic system 600. For example, the sensor(s) may include an accelerometer, a rate gyroscope, and/or other motion-based sensor(s). The sensor(s) 610 may include one or more biometric sensors and/or image sensors for authenticating a user.

The bus 618 also couples the electronic system 600 to one or more networks and/or to one or more network nodes through the one or more network interface(s) 616. In this manner, the electronic system 600 can be a part of a network of computers (such as a local area network or a wide area network). Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the present disclosure. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A vehicle management system, comprising:
    a controller configured to:
        obtain different types of data associated with a route projection of a vehicle;
        determine a thermal demand projection of the vehicle that maps to at least a portion of the route projection based on the different types of data; and
        adjust a temperature of a battery of the vehicle to within a predefined temperature range based on the thermal demand projection for the at least a portion of the route projection, the temperature of the battery being adjusted by a temperature delta that is based on an amount of energy change in the battery associated with the thermal demand projection.

2. The vehicle management system of claim 1, wherein the temperature of the battery is adjusted to within the predefined temperature range at least a threshold time prior to the vehicle reaching a type of terrain at a location of a route that corresponds to the at least a portion of the route projection.

3. The vehicle management system of claim 1, wherein the controller is configured to:
    measure the temperature of the battery at least a threshold time prior to the vehicle reaching a type of terrain at a location of a route that corresponds to the at least a portion of the route projection;
    determine whether the temperature of the battery is maintained within the predefined temperature range corresponding to the at least a portion of the route projection; and
    adjust the temperature of the battery to within the predefined temperature range prior to the vehicle reaching the type of terrain at the location of the route when the temperature of the battery is not maintained within the predefined temperature range.

4. The vehicle management system of claim 1, wherein 1) the controller is configured to determine whether the thermal demand projection is predicted to cause at least in part the temperature of the battery to exceed a temperature threshold at the at least a portion of the route projection, 2) the temperature of the battery is adjusted based on the thermal demand projection being predicted to cause at least in part the temperature of the battery to exceed the temperature threshold at the at least a portion of the route projection, and 3) the predefined temperature range includes the temperature threshold.

5. The vehicle management system of claim 4, wherein the temperature of the battery is adjusted by increasing the temperature of the battery to within the predefined temperature range based on an ambient environment temperature surrounding the vehicle and the thermal demand projection being predicted to cause the temperature of the battery to decrease beyond the temperature threshold.

6. The vehicle management system of claim 4, wherein the temperature of the battery is adjusted by reducing the temperature of the battery to within the predefined temperature range based on an ambient environment temperature surrounding the vehicle and the thermal demand projection being predicted to cause the temperature of the battery to increase beyond the temperature threshold.

7. The vehicle management system of claim 1, wherein the temperature of the battery is adjusted to within the predefined temperature range by an incremental change in temperature that corresponds to at least an amount of energy to be discharged from the battery responsive to one or more propulsion events of the vehicle when the vehicle reaches a type of terrain at a location of a route that corresponds to the at least a portion of the route projection.

8. The vehicle management system of claim 1, wherein the temperature of the battery is adjusted to within the predefined temperature range by an incremental change in temperature that corresponds to at least an amount of energy to be stored in the battery responsive to one or more regenerative braking events of the vehicle when the vehicle reaches a type of terrain at a location of a route that corresponds to the at least a portion of the route projection.

9. The vehicle management system of claim 1, wherein the controller is configured to:
    monitor the temperature of the battery after the temperature of the battery is adjusted to within the predefined temperature range;
    determine whether the temperature of the battery is maintained within the predefined temperature range during at least a threshold time prior to the vehicle reaching a type of terrain at a location of a route that corresponds to the at least a portion of the route projection; and
    adjust the temperature of the battery incrementally until the temperature of the battery is adjusted to within the predefined temperature range prior to the vehicle reaching the type of terrain at the location of the route.

10. The vehicle management system of claim 1, wherein the different types of data comprises one or more of map data, environmental temperature data, or system mass data associated with the vehicle.

11. A method of managing a vehicle, the method comprising:
 determining a route projection of a vehicle based at least in part on user input;
 obtaining thermal loading data comprising different types of data associated with the route projection;
 determining a thermal demand projection of the vehicle that maps to at least a portion of the route projection based on the thermal loading data; and
 adjusting a temperature of a battery of the vehicle to within a predefined temperature range at least a threshold time prior to the vehicle reaching a type of terrain at a location of a route that corresponds to the at least a portion of the route projection based on the thermal demand projection, the temperature of the battery being adjusted by a temperature delta that is based on an amount of energy change in the battery associated with the thermal demand projection.

12. The method of claim 11, further comprising:
 measuring the temperature of the battery at least a threshold time prior to the vehicle reaching a type of terrain at a location of a route that corresponds to the at least a portion of the route projection;
 determining whether the temperature of the battery is maintained within the predefined temperature range corresponding to the at least a portion of the route projection; and
 adjusting the temperature of the battery to within the predefined temperature range prior to the vehicle reaching the type of terrain at the location of the route when the temperature of the battery is not maintained within the predefined temperature range.

13. The method of claim 11, further comprising determining whether the thermal demand projection is predicted to cause at least in part the temperature of the battery to exceed a temperature threshold at the at least a portion of the route projection, wherein the temperature of the battery is adjusted based on the thermal demand projection being predicted to cause at least in part the temperature of the battery to exceed the temperature threshold at the at least a portion of the route projection, wherein the predefined temperature range includes the temperature threshold.

14. The method of claim 13, wherein the temperature of the battery is adjusted by increasing the temperature of the battery to within the predefined temperature range based on an ambient environment temperature surrounding the vehicle and the thermal demand projection being predicted to cause the temperature of the battery to decrease beyond the temperature threshold.

15. The method of claim 13, wherein the temperature of the battery is adjusted by reducing the temperature of the battery to within the predefined temperature range based on an ambient environment temperature surrounding the vehicle and the thermal demand projection being predicted to cause the temperature of the battery to increase beyond the temperature threshold.

16. The method of claim 11, wherein the temperature of the battery is adjusted to within the predefined temperature range by an incremental change in temperature that corresponds to at least an amount of energy to be discharged from the battery responsive to one or more propulsion events of the vehicle when the vehicle reaches a type of terrain at a location of a route that corresponds to the at least a portion of the route projection.

17. The method of claim 11, wherein the temperature of the battery is adjusted to within the predefined temperature range by an incremental change in temperature that corresponds to at least an amount of energy to be stored in the battery responsive to one or more regenerative braking events of the vehicle when the vehicle reaches a type of terrain at a location of a route that corresponds to the at least a portion of the route projection.

18. The method of claim 11, further comprising:
 monitoring the temperature of the battery after the temperature of the battery is adjusted to within the predefined temperature range;
 determining whether the temperature of the battery is maintained within the predefined temperature range during at least a threshold time prior to the vehicle reaching a type of terrain at a location of a route that corresponds to the at least a portion of the route projection; and
 adjusting the temperature of the battery incrementally until the temperature of the battery is adjusted to within the predefined temperature range prior to the vehicle reaching the type of terrain at the location of the route.

19. The method of claim 11, wherein the thermal demand projection indicates a charging event at the least a portion of the route projection, and wherein the adjusting further comprises reducing the temperature of the battery by the temperature delta to pre-cool the battery prior to the charging event and to maintain the temperature of the battery within the predefined temperature range during the charging event.

20. A vehicle, comprising:
 a battery;
 a temperature control unit; and
 a controller configured to:
  determine a thermal demand projection of a vehicle that maps to at least a portion of a route projection of the vehicle based on different types of data associated with the route projection; and
  adjust, using the temperature control unit, a temperature of the battery to within a predefined temperature range by increasing the temperature of the battery based on the thermal demand projection being predicted to cause the temperature of the battery to decrease beyond a first temperature threshold or by reducing the temperature of the battery based on the thermal demand projection being predicted to cause the temperature of the battery to increase beyond a second temperature threshold, the temperature of the battery being adjusted by a temperature delta that is based on an amount of energy change in the battery associated with the thermal demand projection.

* * * * *